United States Patent [19]

Hirschfeld

[11] 3,864,087
[45] Feb. 4, 1975

[54] TITRATING SYSTEM
[75] Inventor: Tomas Hirschfeld, Framingham, Mass.
[73] Assignee: Block Engineering, Inc., Cambridge, Mass.
[22] Filed: May 14, 1973
[21] Appl. No.: 359,845

[52] U.S. Cl. ............... 23/253 R, 23/230 R
[51] Int. Cl. .................. G01n 21/08, G01n 21/06
[58] Field of Search ............ 23/230, 232, 253, 254; 204/195 T

[56] References Cited
UNITED STATES PATENTS
3,404,962  10/1968  Medlar et al. .................. 23/253
3,723,062  3/1973  Dahms ............................ 23/253 X

*Primary Examiner*—R. E. Serwin
*Attorney, Agent, or Firm*—Schiller & Pandiscio

[57] ABSTRACT

A chemical measuring system of the titration type comprises an elongated, hollow conduit, the walls of which are formed of a porous membrane. The conduit is suspended in a body of titrant. In operation a sample fluid is passed through the conduit. Titrant permeates the walls of the conduit and reacts with the sample. An end point is observed by an observable change at some position along the conduit, that position being proportional to the concentration of the sample.

15 Claims, 4 Drawing Figures

TITRATING SYSTEM

This invention relates to chemical measuring systems and more particularly to improved methods and apparatus for determining the concentration of a sample in a flow stream, by a novel titration system.

Various systems for determining the concentration of a sample in solution are known in the art. Typical prior art systems such as chromatographic, electrochemical and indicator systems have a number of disadvantages. Indicator systems and chromatographic systems generally are time consuming to use, and not suitable for continuous, realtime monitoring.

While this latter disadvantage may be overcome by the use of electrochemical monitoring systems, electrochemical systems have the disadvantages that they are somewhat complicated, and generally involve the use of relatively expensive equipment. Also, such systems may not be suitable for measuring certain ions, and further may require frequent calibration.

A principal object of the present invention is, therefore, to provide a novel and improved system for measuring the concentration of selected ions in solution. Other objects of the present invention are to provide such a system which is simple and relatively inexpensive to manufacture; to provide such a system which is easy to use; and to provide a system of the type described which allows continuous, real-time monitoring.

Other objects of the present invention will, in part, be obvious and will, in part, appear hereinafter.

Generally, to achieve the foregoing and other objects, the present invention contemplates a system including an elongated, hollow conduit, the walls of which are formed of a porous membrane, suspended in a body of titrant liquid. The term "porous" as used herein is intended in a broad sense and is applicable as well to true osmotic membranes, dialyzing membranes, molecular sieves and the like. In operation, a sample fluid is passed through the conduit while the latter is suspended in the titrant. If the concentration of material on opposite sides of the membrane differs, a net flow of at least one component of the titrant or sample will occur through the membrane and ultimately causes an abrupt observable change in the sample. It will be seen that as the flowing sample stream progresses down the conduit, the stream is exposed to an ever-increasing proportion of titrant. The equivalence or end point can be observed by the abrupt change in an indicator color at a position along the conduit, which position is proportional to the concentration of the sample.

For a titrant of known concentration and a known constant sample flow rate, the position at which the observable change occurs can be calibrated in terms of concentration of sample, or the conduit can be provided with a direct reading scale indicating sample concentrations.

For a fuller understanding of the nature and objects of the present invention, reference should be had to the following detailed description taken in connection with the accompanying drawings wherein.

Figure 1:
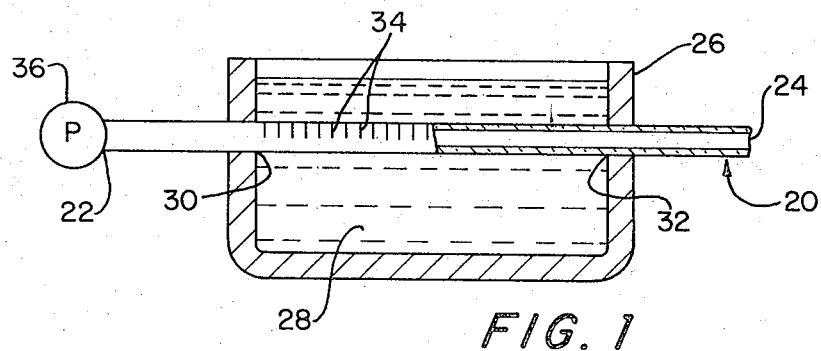
FIG. 1 is a side-elevational view of apparatus of the present invention.

Reference is now made to FIG. 1 of the drawings wherein there is illustrated a preferred embodiment of apparatus useful in the instant invention.

The apparatus comprises hollow elongated conduit 20, typically a transparent or translucent cylindrical tube of substantially uniform cross-sectional area, open at both ends 22 and 24 so that a flowstream of sample liquid can be passed through the conduit. The conduit wall (or walls) is of substantially uniform thickness and is formed of a porous membrane so that a constituent or constituents of liquids can flow through the membrane. The conduit wall should be formed of a material which is substantially chemically inert to the sample and titrant used.

Conduit 20 is disposed in container 26 which is adapted to hold a body 28 of titrant. The fluid capacity of container 26 preferably should be greatly in excess of the interior volume of conduit 20. It will be seen that when container 26 holds an appropriate body of titrant, there is an initial point 30 at which the body of titrant first contacts the upstream portion of conduit 20 (with reference to a fixed direction of flow of sample through conduit 20), and a final point 32 at which the body of titrant last contacts a downstream portion of conduit 20.

Means are provided for determining the relative position along conduit 20 between points 30 and 32 at which a change observable through the wall of the conduit may occur in the sample stream due to a differential flow through the membranous wall of the conduit. In simple form, as shown in FIG. 1, a plurality of fiducial marks 34 forming a scale, can be placed on conduit 20 so that the location of the observable change in the flow stream can be related metrically to point 30.

Figure 2:
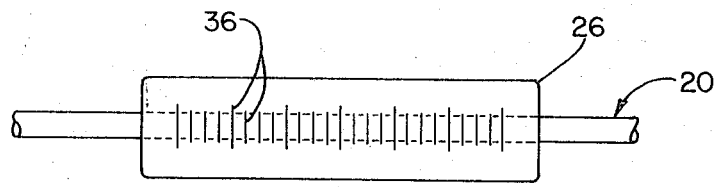
FIG. 2 is another embodiment of the apparatus of the present invention.

In yet another embodiment, as shown in FIG. 2, container 26 is provided as a transparent hollow cylinder in which conduit 20 is disposed coaxially. In this version, a scale provided by a plurality of marks 36 is located on container 26. To reduce parallax error, the fiducial marks or scale gradations can be engraved completely around container 26, or conduit 20 can be instead disposed closely adjacent the marked portion of the wall of containers 26. Alternatively the scale gradations can be marked on conduit 20 and container 26 provided with an anamorphic magnifying surface much as is the case of a clinical thermometer. Also, one can simply employ other means for measuring the distance between initial point 30 and the point of observable change in the flowstream, e.g., a traveling microscope or the like. However, the latter alternative may increase the complexity and cost of the device, hence may be not particularly desirable. In any case, the calibration of the system is feasible substantially only when all parameters (except the unknown concentration of the sample) are fixed. To this end, in order to insure a known flow rate of sample through the conduit, means shown schematically as pump 36, are included to provide a substantially constant pressure or head on the sample solution.

The titrant employed is not critical to the invention. However, the titrant also should be capable of reacting either chemically or physically with the sample to cause a readily observable, e.g., colorimetric, change to occur. Typically, the titrant should be capable of reacting rapidly with the sample, to a stoichiometric or end point. The titrant or sample preferably also includes an amount of indicator in sufficient quantities to exhibit a sharp color change relative to the degree of reaction between the titrant and the sample, e.g., typically at the end point of reaction.

The titrant may be an accurately measured amount of pure or assayed substance in an accurately measured volume of liquid solvent, or the titrant may be a solution standardized by procedures well known in the art. The strength of the titrant may be varied over a wide range, depending on such factors as quantity and concentration of the sample, and in the case of an added color indicator, sensitivity of such indicator. Generally, it is not feasible to employ extremely low concentration titrants since such may not provide accurate end point readings, and may require relatively large additions of titrant, especially when used with sample of streams of substantially higher concentrations. Use of highly concentrated titrant solutions can tend to neutralize the sample too rapidly and thus lead to inaccuracies.

Various combinations of titrant, sample solution, indicator and membrane may be made, all of which however, involve flow through the membrane.

In one case, the membrane may be a true osmotic membrane, and if the sample solution is a mixture of solute and solvent, the titrant can then be simply the solvent. For example, assume that the sample solution is initially aqueous solution of HCl at pH lower than 3.0, and contains a small quantity of dinitrophenol and is therefore colorless, and that the titrant is then simple water. As the sample solution travels down the conduit, because the wall of the latter is osmotic, water transport will occur through the wall into the conduit tending to dilute the sample and reduce the hydrogen ion activity therein. When the pH increases to about 3.0, the indicator will then turn the diluted solution to a yellow color. If the pressure head on the sample is constant, the distance that the conduit extends into the titrant to the point of color change will be proportional to the initial pH of the sample.

In another typical case, the membrane may be a dialyzing membrane and here if the sample solution is a mixture of solute and solvent, the titrant can be a mixture of another solute and solvent. For example, if the sample solution is a mixture of acid such as HCl and phenolphthalien, the titrant is an aqueous base such as NaOH in water, and the membrane permits substantially preferential transport of hydroxyl ions then the distance between the points of initial contact of the conduit with the titrant to the point on the conduit at which the color change of phenolphthalien indicates an end point, is proportioned to the initial pH of the sample In yet a broader application of the principles of the present invention, the membrane is simply a porous barrier permeable at a substantially fixed rate by fluids (and entrained or dissolved molecules) by such processes as simple capillarity. It will be appreciated in such case that the transport across the membrane can be bidirectional, the sample solution diffusing outwardly into the titrant and the titrant diffusing inwardly into the sample. The rates at which the respective titrant and sample are transported through the conduit wall need however not be identical but can be mediated by such factors as relative viscosity, the size of pertinent molecules in the fluid, the pore size and shape and the like.

Figure 3:
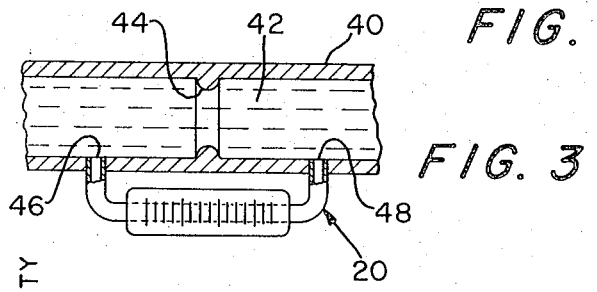
FIG. 3 is a partly cross-sectional view showing the application of the device of FIG. 2 to process monitoring.

Referring now to FIG. 3, there is shown a graph based on a coordinate system comprising vertical or ordinate axis 50 and horizontal axis or abscissa 52 which intersect at an origin 54. All coordinates are linear.

The scale on ordinate 50 represents concentration of sample, in normality, and the scale on abscissa 52 represents conduit lengths, in cm. as measured in use of the device of the instant invention as will be described in detail hereinafter.

In operation, a sample fluid is fed or pumped under a constant head into hollow conduit 20 at upstream end 22 and flowed down the conduit. The head can be sufficient to cause the sample to flow at a velocity in excess of its Reynolds number in order to achieve turbulent flow. Alternatively and preferably conduit 20 may be packed, e.g., with particulate material 38 such as sand or the like, to randomize the flow path.

Obviously, packing material if used, should also be chemically inert to the sample and titrant. The flow rate of the sample through the conduit should be substantially constant. Thus, for sample fluids showing considerable viscosity variations, a flow restrictor can be used as a driving pressure source as is well known in the art to maintain a substantially constant flow rate. Because the wall of conduit 20 is semi-permeable, the differential flow of fluid therethrough between the sample and titrant causes changes in the composition of the sample stream as it progresses along the conduit. As noted, these changes may be physical (i.e., dilution of the sample) or chemical (i.e., reaction between the titrant and sample). In either case a desired end point can be observed using an appropriate indicator which changes a characteristic, such as color, at that end point. Because all of the variable parameters such as flow rate, permeation rate through the wall, and titrant concentration are fixed or predetermined, the initial concentration of the sample stream can then be expressed in terms of the distance between the point 30 and the point on the conduit at which the observable change of indicator color occurs.

When using for example the embodiment of FIG. 2 of the invention to monitor a process flow, provision can be made to render the system relatively insensitive to viscosity changes in the process flow. As shown in FIG. 3, conduit 20 is placed as a shunt along process pipe 40 which carries sample fluid 42. Thus, a small proportion of the sample material is diverted through conduit 20 and back into the process pipe. Constriction 44 is placed in process pipe 40 between entrance and exit ports 46 and 48 to and from conduit 20. Across this constriction there will occur a pressure drop in the flow in the process pipe which drop is directly proportional to the viscosity of the fluid. In conduit 20, the flow velocity is proportional to the ratio of the pressure drop between its ends to the viscosity of the fluid. Hence, the flow velocity in conduit 20 will remain unaffected by viscosity changes in fluid 42.

The invention is advantageously illustrated by, but not limited to the following examples, in which all percentages are in volume percent unless otherwise indicated:

EXAMPLE I

In order to provide a conduit having walls which are permeable to hydroxyl ions ($OH^-$) in solution, but which are substantially impervious to hydrogen ions ($H^+$) in solution a single filter tube from an Amicon H1DP10 diafiber cartridge (molecular weight cutoff 10,000, diameter 200$\mu$, wall thickness 50$\mu$, length 15 cm, available from Amicon Corporation, Lexington, Mass) is selected. The tube is suspended in a body of titrant comprising a solution of 0.6 N - NaOH in 60 percent ethanol, in water. Titrant temperature is 25°C. The tube is packed along substantially, its entire length with cryolite to provide optical index matching; otherwise, the tube would appear quite opaque.

A sample solution (also at 25°C) comprising 1 N HCL and containing 0.05 percent phenolphthalein in 60 percent ethanol in water is flowed through the fiber tube at a flow rate of 1.2 cm/sec. flow, starting from end 22. The NaOH and HCl are ionized in the respective titrant and sample solutions. A weak pink color is observed along substantially the entire length of the tube. Hydroxyl ions permeate walls of the tube and react with hydrogen ions in the sample, neutralize the hydrogen ions, and form water. A sudden increase in red color is observed as the end of a column at a position on the tube which is 9.1 $\pm$ 0.1 cm from point 30. The red color establishes that there are no free hydrogen ions at that position in the tube which indicates spatially the reaction end point.

The weak pink color observed along the tube before the end point is reached is believed to be due to a small amount of outward diffusion of indication into the titrant. This is seen to be substantially eliminated by repeating the experiment at lower ethanol concentrations.

EXAMPLE II

Figure 4:
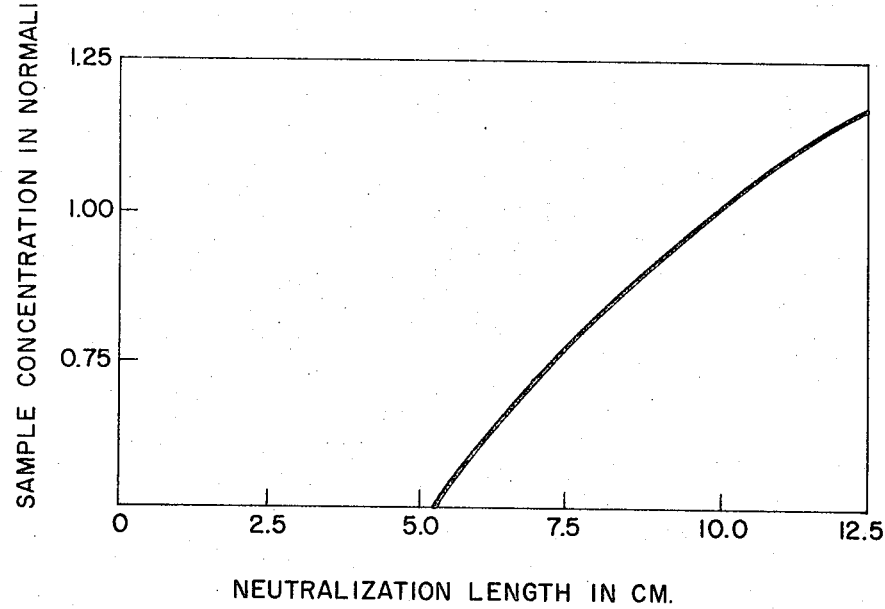
FIG. 4 is a graph of a calibration curve of apparatus of the present invention.

The purpose of this Example is to show calibration of the system of this invention. This Example also illustrates how the system of this invention can be used to continuously monitor a sample stream of varying concentration. The procedure of Example I is repeated except with the following change:

The sample stream concentration is varied as follows: A sample stream (25°C) comprising 0.5 NHCl and containing 0.05 percent phenophthalein in 60 percent ethanol is flowed through the tube in place of the 1 N HCl stream. The end portion of the red column is seen to shift along the tube. The system is allowed to equilibrate for 30 seconds. The position of the end of the column of color is observed after the latter becomes substantially statically positioned, and the result is recorded in FIG. 4. The concentration of the sample stream is again altered, and the column end is observed to shift to a new position, allowed to equilibrate, and the result is recorded in FIG. 4. Altering and recording is repeated a number of times, and a calibration curve for the tube is obtained in FIG. 4. Either container 26 (as in FIG. 2) or conduit 24 (as in FIG. 1) is then marked along its length as a scale H. The concentration of the sample stream is again altered to a concentration of 1 N HCl in 60 percent ethanol in water, i.e., as in Example I. The color column end is observed to shift to a position on a tube which is 9.1$\pm$0.1 cm from point 30, which is the same position as recorded in Example I.

Diameter and wall thickness fluctuations in the conduit will introduce corresponding changes in the position of the end point or color column end. Therefore to avoid calibration of individual conduits, it is preferred to use carefully selected conduits or to manufacture the conduit under rigorous fabrication controls. The latter alternative is clearly preferable for mass production purposes.

As will be seen from the foregoing that in addition to the advantages herein enumerated, the chemical measuring system provides an extremely simple device for determining concentrations of a sample in solution. The device employs no electronics or optics, and it has no moving parts. Additionally, the device is easy to use, gives continuous real-time, direct readings, and is adaptable to mass production techniques from relatively inexpensive materials.

Still other changes may be made in the above apparatus and process without departing from the scope of the invention herein involved. For example, the color indicator could be coated on the inside of the tube, or absorbed on the packing material (if any). Or, if desired, the color indicator may be admixed with the titrant, or coated on the outer wall of the tube. Obviously, in such latter two embodiments the color indicator must be able to permeate the walls of the tube. It is therefore intended that all matters contained in the above description or shown in the accompanying drawings shall be interpreted as illustrative and not in a limiting sense.

I claim:

1. A chemical measuring system for titrating a sample solution with a titrant capable of reacting with said solution to produce an observable end-point change, and comprising, in combination:
   - means for containing a body of said titrant;
   - a hollow, elongated conduit disposed within said means for containing, the wall of said conduit being porous so that a net flow through said wall can occur between said body of titrant and a stream of sample solution flowing through said conduit; and
   - means for determining the relative position along said conduit at which said end-point change is observable.

2. A system as defined in claim 1 wherein said wall of said conduit is semi-permeable.

3. A system as defined in claim 2 wherein said wall is formed of a dialyzing membrane.

4. A system as defined in claim 1 wherein said conduit is substantially transparent.

5. A system as defined in claim 1 wherein said conduit is substantially translucent.

6. A system as defined in claim 1 including a color indicator material admixed with said titrant of said sample.

7. A system as defined in claim 1 wherein said means for determining comprises a scale extending along said conduit.

8. A system as defined in claim 1 wherein said conduit has a substantially uniform cross-sectioned area.

9. A system as defined in claim 1 wherein the wall of said conduit has a substantially uniform thickness.

10. A system as defined in claim 1 including means disposed in said conduit for providing turbulence to said stream in said conduit.

11. A system as defined in claim 1 including means defined in said conduit for mixing said stream with any titrant flow through said wall.

12. A system as defined in claim 1 including means for applying a substantially constant pressure head on said sample solution.

13. A chemical measuring system for continuously titrating a sample solution flow through a pipe with a titrant capable of reacting with said solution to produce an observable end-point change, and comprising, in combination:

means for containing a body of said titrant;

a hollow, elongated conduit disposed within said means for containing, the wall of said conduit being porous so that a net flow through said wall can occur between said body of titrant and a stream of sample solution flowing through said conduit;

an internal constriction in said pipe;

the ends of said conduit being connected to said pipe on opposite sides of said constriction; and means for determining the relative position along said conduit at which said end-point change is observable.

14. A chemical measuring system for titrating a sample fluid with a titrant capable of reacting with said fluid to produce an observable end-point change and, comprising in combination:

first means for containing a body of said titrant fluid;

second means for containing a body of said sample;

at least one of the said first and second means constituting a conduit for the flow of the corresponding body of fluid therethrough;

a common wall disposed between said conduit and the other of said first or second means, said wall being porous so that a net flow through said wall can occur between the body of fluid flowing through said conduit and the other body of fluid in said other means; and means for determining the relative position along said conduit at which said end-point change is observable.

15. A chemical measuring system for titrating a sample solution with a titrant capable of reacting with said fluid to produce an observable end-point change, and comprising in combination;

means for containing a first body of liquid;

a hollow elongated conduit having a porous wall in common with said means so that a net flow through said wall can occur between said first body of liquid and a flow stream of liquid flowing through said conduit, said first body being one of said solution of said titrant, said second body being the other of said solution or said titrant; and means for determining the relative position along said conduit at which said end-point change is observable.

* * * * *

UNITED STATES PATENT OFFICE
CERTIFICATE OF CORRECTION

Patent No. 3,864,087          Dated February 4, 1975

Inventor(s) Tomas Hirschfeld

It is certified that error appears in the above-identified patent and that said Letters Patent are hereby corrected as shown below:

IN THE CLAIMS

Column 6, line 67, "flow" should be corrected to read --flowing--.

Signed and Sealed this second Day of September 1975

[SEAL]

Attest:

RUTH C. MASON
Attesting Officer

C. MARSHALL DANN
Commissioner of Patents and Trademarks